(12) United States Patent
McBeath et al.

(10) Patent No.: US 8,155,222 B2
(45) Date of Patent: Apr. 10, 2012

(54) METHOD AND APPARATUS FOR TRANSMITTING AND RECEIVING CONTROL INFORMATION IN A WIRELESS COMMUNICATION SYSTEM

(75) Inventors: Sean Michael McBeath, Keller, TX (US); Zhigang Rong, San Diego, CA (US); Yunsong Yang, San Diego, CA (US); Changhoi Koo, Plano, TX (US)

(73) Assignee: FutureWei Technologies, Inc., Plano, TX (US)

( * ) Notice: Subject to any disclaimer, the term of this patent is extended or adjusted under 35 U.S.C. 154(b) by 349 days.

(21) Appl. No.: 12/561,100

(22) Filed: Sep. 16, 2009

(65) Prior Publication Data

US 2010/0067593 A1  Mar. 18, 2010

Related U.S. Application Data

(60) Provisional application No. 61/097,432, filed on Sep. 16, 2008.

(51) Int. Cl.
*H04L 27/28* (2006.01)
(52) U.S. Cl. .................................................. 375/260
(58) Field of Classification Search .................. 375/260, 375/130, 232, 233, 350; 370/328, 392, 350; 455/436, 437, 522
See application file for complete search history.

(56) References Cited

U.S. PATENT DOCUMENTS 7,873,010 B2 * 1/2011 Love et al. .................... 370/330
2007/0121543 A1 * 5/2007 Kuchibhotla et al. ......... 370/329

OTHER PUBLICATIONS

"3rd Generation Partnership Project; Technical Specification Group Radio Access Network; Evolved Universal Terrestrial Radio Access (E-UTRA); Physical Layer Procedures (Release 8)," 3GPP TS 36.213 V8.3.0, Technical Specification, May 2005, 45 pages.
Hamiti, S., "The Draft IEEE 802.16m System Description Document," IEEE 802.16 Broadband Wireless Access Working Group, Jul. 29, 2008, 89 pages.
Yang, Y., et al., "Proposed Baseline Content on the Downlink Control Structure for the 802.16m SDD," IEEE 802.16 Broadband Wireless Access Working Group, May 12, 2008, 17 pages.

* cited by examiner

*Primary Examiner* — Khai Tran
(74) *Attorney, Agent, or Firm* — Slater & Matsil, L.L.P.

(57) ABSTRACT

A base station transmits control information to a mobile station. A first control channel is transmitted to the mobile station. The first control channel contains an indication of the number of control channel occurrences in a frame. A second control channel is transmitted to the mobile station in a control subframe. The second control channel contains information for communicating a packet between the base station and the mobile station. The control subframe is determined from the number of control channel occurrences in the frame. The packet can then be communicated between the base station and the mobile station in a subframe based on the control channels transmitted.

19 Claims, 13 Drawing Sheets

| Parameter Name | Number of Bits |
|---|---|
| Configuration Count | 8 |
| DL:UL Ratio | 3 |
| Superframe Number | 8 |
| Antenna Configuration | 2 |
| Number Control Subframes Per Frame | 3 |
| Number Control Blocks Per Subframe | 4 |

FIG. 7

| Parameter Name | Number of Bits |
|---|---|
| Connection Identifier | 16 |
| Persistent/Non-Persistent | 1 |
| MIMO | 4 |
| Relevance | 2 |
| Time-Frequency Resource Assignment | 10 |
| Modulation/Coding | 4 |

FIG. 8

| DL Subframes | Num Ctrl Subframes | 0 | 1 | 2 | 3 | 4 | 5 | 6 | 7 |
|---|---|---|---|---|---|---|---|---|---|
| 8 | 2 | 1 |   |   |   |   |   |   |   |
| 8 | 3 | 1 | 1 |   |   | 1 |   | 1 |   |
| 8 | 4 | 1 | 1 | 1 |   | 1 |   | 1 |   |
| 8 | 5 | 1 | 1 | 1 |   | 1 | 1 | 1 |   |
| 8 | 6 | 1 | 1 | 1 |   | 1 | 1 | 1 |   |
| 8 | 7 | 1 | 1 | 1 | 1 | 1 | 1 | 1 | 1 |
| 8 | 8 | 1 | 1 | 1 | 1 | 1 | 1 | 1 | 1 |
| 7 | 2 | 1 | 1 |   |   |   |   |   | ▨ |
| 7 | 3 | 1 | 1 | 1 | 1 |   | 1 |   | ▨ |
| 7 | 4 | 1 | 1 | 1 | 1 | 1 | 1 |   | ▨ |
| 7 | 5 | 1 | 1 | 1 | 1 | 1 | 1 | 1 | ▨ |
| 7 | 6 | 1 | 1 | 1 | 1 | 1 | 1 | 1 | ▨ |
| 7 | 7 | 1 | 1 | 1 | 1 | 1 | 1 | 1 | ▨ |
| 6 | 2 | 1 | 1 | 1 |   |   |   | ▨ | ▨ |
| 6 | 3 | 1 | 1 | 1 | 1 | 1 |   | ▨ | ▨ |
| 6 | 4 | 1 | 1 | 1 | 1 | 1 | 1 | ▨ | ▨ |
| 6 | 5 | 1 | 1 | 1 | 1 | 1 | 1 | ▨ | ▨ |
| 6 | 6 | 1 | 1 | 1 | 1 | 1 | 1 | ▨ | ▨ |
| 5 | 2 | 1 | 1 | 1 | 1 |   | ▨ | ▨ | ▨ |
| 5 | 3 | 1 | 1 | 1 | 1 | 1 | ▨ | ▨ | ▨ |
| 5 | 4 | 1 | 1 | 1 | 1 | 1 | ▨ | ▨ | ▨ |
| 5 | 5 | 1 | 1 | 1 | 1 | 1 | ▨ | ▨ | ▨ |
| 4 | 2 | 1 | 1 | 1 | 1 | ▨ | ▨ | ▨ | ▨ |
| 4 | 3 | 1 | 1 | 1 | 1 | ▨ | ▨ | ▨ | ▨ |
| 4 | 4 | 1 | 1 | 1 | 1 | ▨ | ▨ | ▨ | ▨ |
| 3 | 2 | 1 | 1 | 1 | ▨ | ▨ | ▨ | ▨ | ▨ |
| 3 | 3 | 1 | 1 | 1 | ▨ | ▨ | ▨ | ▨ | ▨ |
| 2 | 2 | 1 | 1 | ▨ | ▨ | ▨ | ▨ | ▨ | ▨ |

METHOD AND APPARATUS FOR TRANSMITTING AND RECEIVING CONTROL INFORMATION IN A WIRELESS COMMUNICATION SYSTEM

This application claims the benefit of U.S. Provisional Application No. 61/097,432, filed on Sep. 16, 2008, which application is hereby incorporated herein by reference.

TECHNICAL FIELD

The present invention relates generally to communication systems and, in particular embodiments, to a method and apparatus for transmitting and receiving control information in a wireless communication system.

BACKGROUND

In an OFDMA communication system, the time-frequency resources of the system are shared among a number of mobile stations. The base station assigns resources to mobile stations using an assignment message, which is transmitted as part of a control channel. It is known to define multiple control channel instances in a particular time period to increase scheduling flexibility and reduce the round trip time for hybrid automatic repeat request (HARQ) transmissions.

Unfortunately, the scheduling flexibility at the base station increases the processing burden at the mobile station. Further, in certain cases, the benefits previously described are not beneficial, due to the traffic type, scheduling algorithm, etc.

SUMMARY OF THE INVENTION

Embodiments of the present invention generally relate to the use transmission and reception of control information in a wireless communication system. In a specific example, the present invention relates to a novel method of transmitting and receiving control information in orthogonal frequency division multiplexing (OFDM) and orthogonal frequency division multiple access (OFDMA) communication systems.

In one aspect, the present invention defines the amount and location of control information to increase the overall system flexibility, with minimal control channel overhead. In another aspect, the present invention provides a method and apparatus for the base station to indicate the location of control information based on a broadcast parameter. In yet another aspect, the present invention provides a method and apparatus for the mobile station to determine the location of control information based on a broadcast parameter.

In a first embodiment, a base station transmits control information to a mobile station. A first control channel is transmitted to the mobile station. The first control channel contains an indication of the number of control channel occurrences in a frame. A second control channel is transmitted to the mobile station in a control subframe. The control subframe is determined from the number of control channel occurrences in the frame. A packet can then be communicated between the base station and the mobile station in a subframe based on the control subframe.

In another embodiment, a mobile station receives control information from a base station. A first control channel is received from the base station. The first control channel contains an indication of the number of control channel occurrences in the frame. A second control channel is received from the base station in a control subframe. The control subframe is determined from the number of control channel occurrences in the frame. A packet can then be communicated between the mobile station and the base station in a subframe based on the control subframe.

In another embodiment, a base station is disclosed. A control unit determines a first control channel containing an indication of a number of control channel occurrences in a frame and a control subframe from the number of control channel occurrences in the frame. A transmission unit transmits the first control channel to a mobile station and the second control channel to the mobile station in the control subframe. The base station communicates with a mobile station by sending or receiving a packet in a subframe based on the control subframe.

In yet another embodiment, a mobile station is disclosed. A receiver receives a first control channel from a base station. The first control channel contains an indication of the number of control channel occurrences in the frame. A control unit determines a control subframe from the number of control channel occurrences in the frame. The receiver can then receive a second control channel from the base station in the control subframe. The mobile station can then communicate with the base station in a subframe based on the control subframe.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present disclosure can be described by the embodiments given below. It is understood, however, that the embodiments below are not necessarily limitations to the present disclosure, but are used to describe a typical implementation of the invention.

Embodiments of the present invention provide a unique method and apparatus for transmitting and receiving control information in a wireless communication system. It is understood, however, that the following disclosure provides many different embodiments, or examples, for implementing different features of the invention. Specific examples of components, signals, messages, protocols, and arrangements are described below to simplify the present disclosure. These are, of course, merely examples and are not intended to limit the invention from that described in the claims. Well known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art. Details regarding control circuitry described herein are omitted, as such control circuits are within the skills of persons of ordinary skill in the relevant art.

Figure 1:
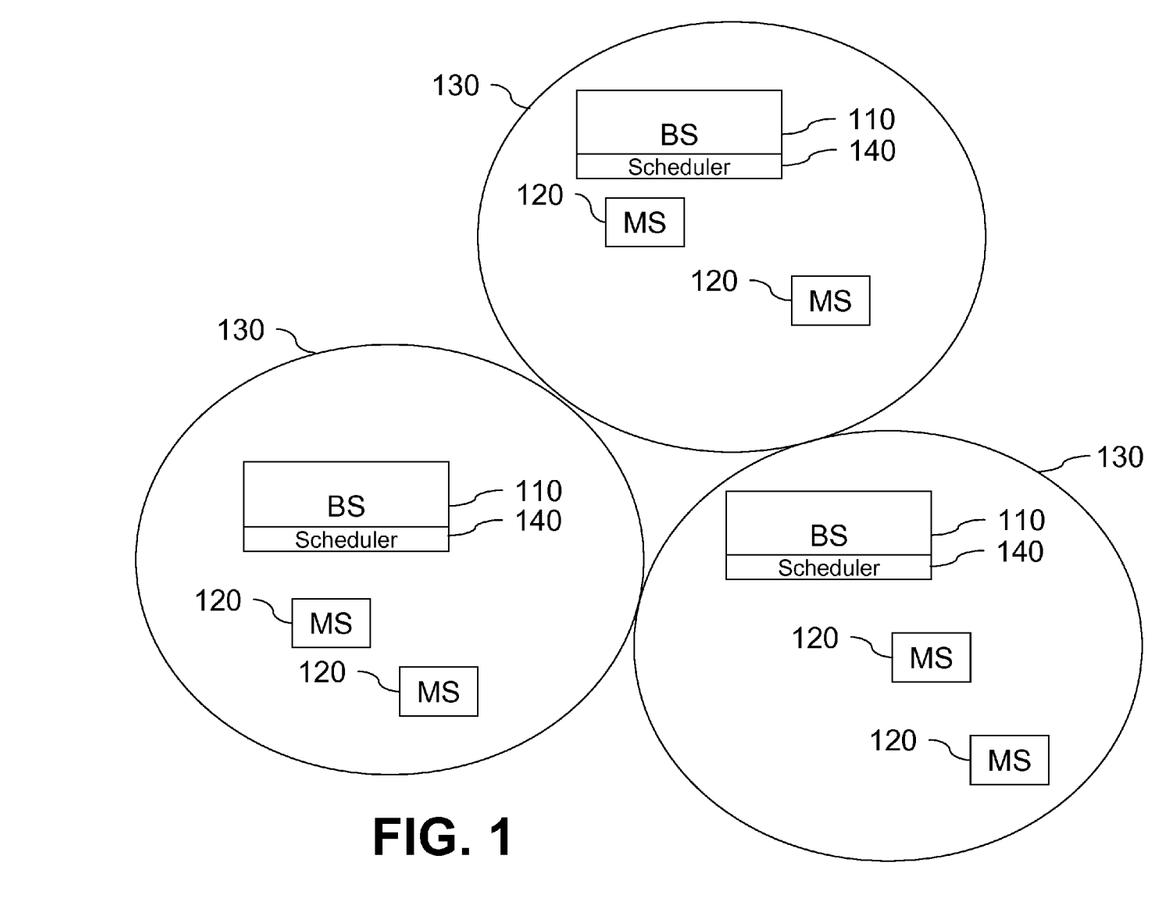
FIG. 1 illustrates a wireless communications network.

FIG. 1 is a wireless communications network comprising a plurality of base stations (BS) 110 providing voice and/or data wireless communication service to a plurality of mobile stations (MS) 120. The BS 110 is also sometimes referred to by other names such as access network (AN), access point (AP), Node-B, and others. Each BS 110 has a corresponding coverage area 130. Referring to FIG. 1, each base station includes a scheduler 140 for allocating radio resources to the mobile stations.

Exemplary wireless communication systems include, but are not limited to, Evolved Universal Terrestrial Radio Access (E-UTRA) networks, Ultra Mobile Broadband (UMB) networks, IEEE 802.16 networks, and other OFDMA based networks. In some embodiments, the network is based on a multiple access scheme other than OFDMA. For example, the network can be a frequency division multiplex access (FDMA) network wherein the time-frequency resources are divided into frequency intervals over a certain time interval, a time division multiplex access (TDMA) network wherein the time-frequency resources are divided into time intervals over a certain frequency interval, and a code division multiplex access (CDMA) network wherein the resources are divided into orthogonal or pseudo-orthogonal codes over a certain time-frequency interval.

Figure 2:
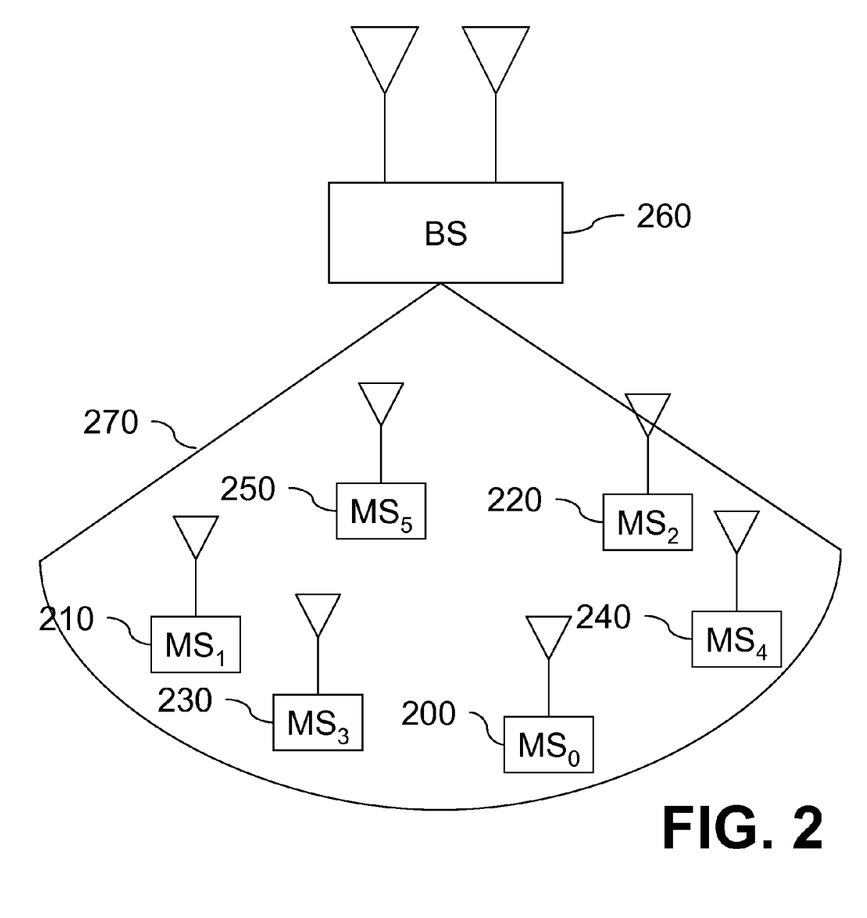
FIG. 2 illustrates a base station and several mobile stations from a wireless communications network.

FIG. 2 illustrates one base station and several mobile stations from the wireless communications network of FIG. 1. The base station has three coverage areas, one of which is shown 270. The coverage area is sometime referred to as a sector. Six mobile stations 200, 210, 220, 230, 240, 250 are in the shown coverage area. The base station typically assigns each mobile station one or more connection identifiers (CID) (or another similar identifier) to facilitate time-frequency resource assignment. The CID assignment can be transmitted from the base station to the mobile station on a control channel and stored at the mobile station, or it can be derived by the mobile station based on a mobile station or base station parameter.

Figure 3:
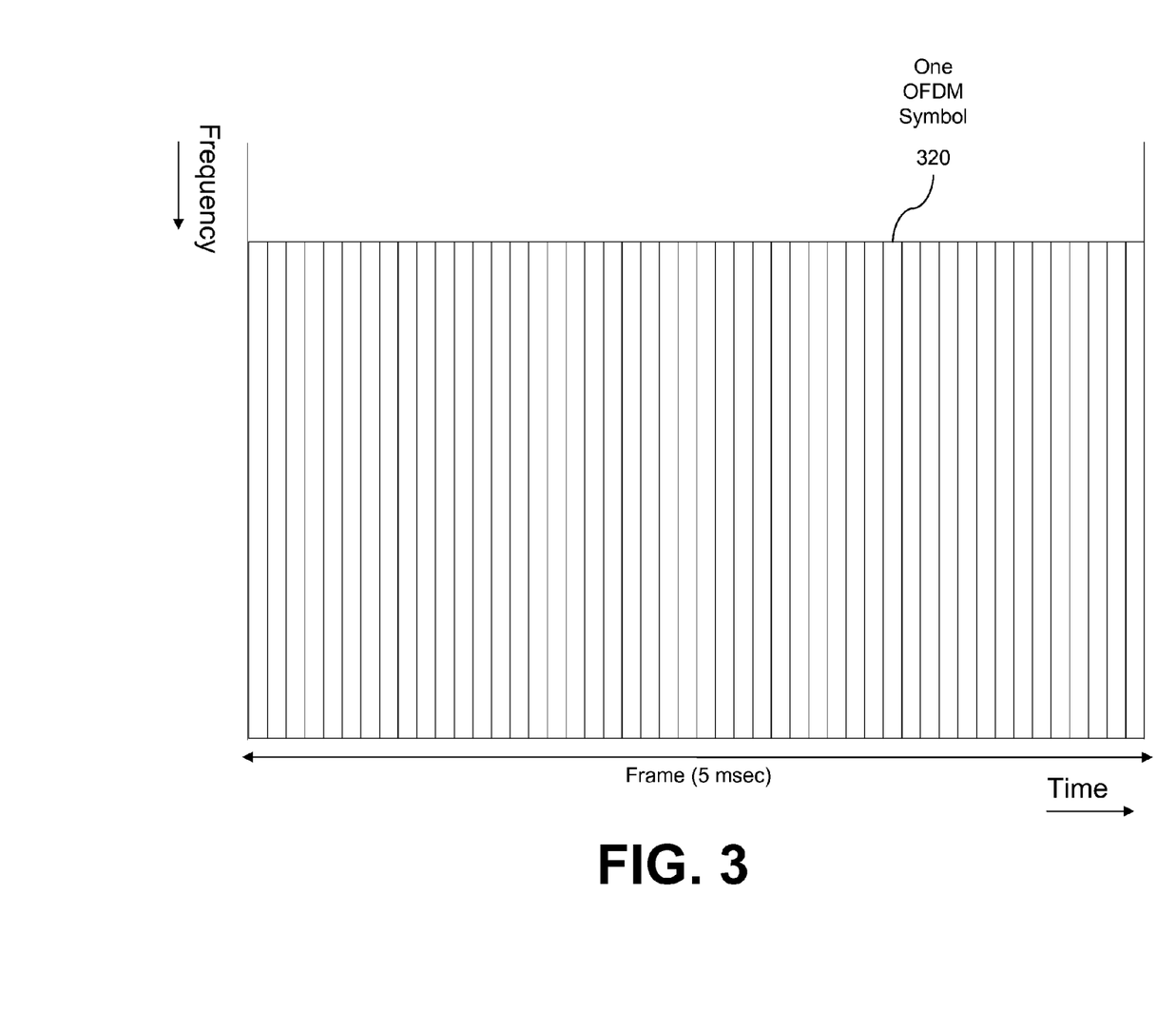
FIG. 3 illustrates an example set of OFDMA time-frequency radio resources.

FIG. 3 illustrates an example set of OFDMA time-frequency radio resources. In OFDMA systems, the time-frequency resources are divided into OFDM symbols and OFDM subcarriers for allocation by the base station scheduler to the mobile stations. In an example OFDMA system, the OFDM subcarriers are approximately 10 kHz apart and the duration of each OFDM symbol is approximately 100 μsec. FIG. 3 illustrates one 5 msec frame of an OFDMA system, such as that defined by the IEEE 802.16e standard. Note that 5 msec is one frame duration and that other frame durations are possible.

Referring again to FIG. 3, in this exemplary embodiment, resources in the time domain (x-axis) are divided into 48 OFDM symbols 320. In the frequency domain (y-axis), the resources are divided into multiple subchannels (not shown), wherein the size of the subchannel depends on the subcarrier permutation scheme. A subcarrier permutation scheme is a mapping from logical subchannels to physical subcarriers.

Downlink (DL) partial usage of subcarriers (PUSC), DL full usage of subcarriers (FUSC), and uplink (UL) PUSC are exemplary subcarrier permutation schemes defined in the IEEE 802.16 standard. Other permutation schemes are also defined in the IEEE 802.16 standard, so DL PUSC, DL FUSC, and UL PUSC are merely used to illustrate the invention. For DL PUSC, in a 5 MHz bandwidth, there are 360 data subcarriers divided into 15 subchannels, wherein each subchannel has 24 data subcarriers. For DL PUSC, the base station must assign an even number of OFDM symbols for each subchannel. For DL FUSC, in a 5 MHz bandwidth, there are 384 data subcarriers divided into 8 subchannels, wherein each subchannel has 48 data subcarriers. For UL PUSC, in a 5 MHz bandwidth, there are 408 subcarriers (data plus pilot) divided into 17 subchannels, wherein each subchannel has 24 subcarriers (16 data plus 8 pilot). For UL PUSC, the number of OFDM symbols for each subchannel must be a multiple of 3. Note that the subchannels are a logical representation of the time-frequency resources of the system.

Each logical time-frequency resource (subchannel) maps to a physical time-frequency resource. The mapping of logical time-frequency resources to physical time-frequency resources depends on which subcarrier permutation is being used. The mapping of logical time-frequency resource to physical time-frequency resources can change with time and can depend on one or more parameters defined by the system.

Figure 4:
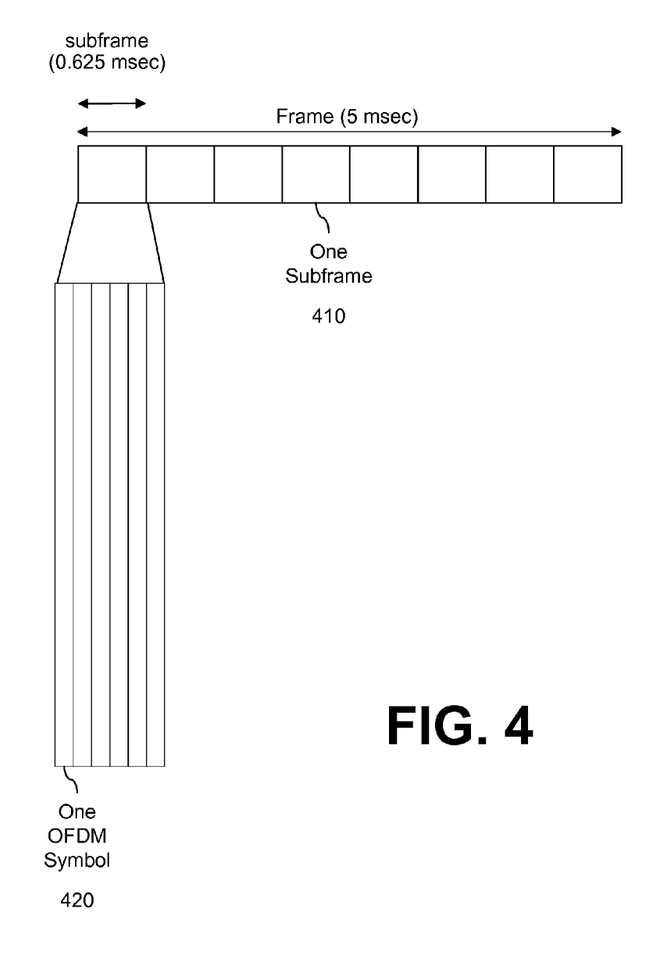
FIGS. 4-6 illustrate an example time domain structure.
Figure 5:
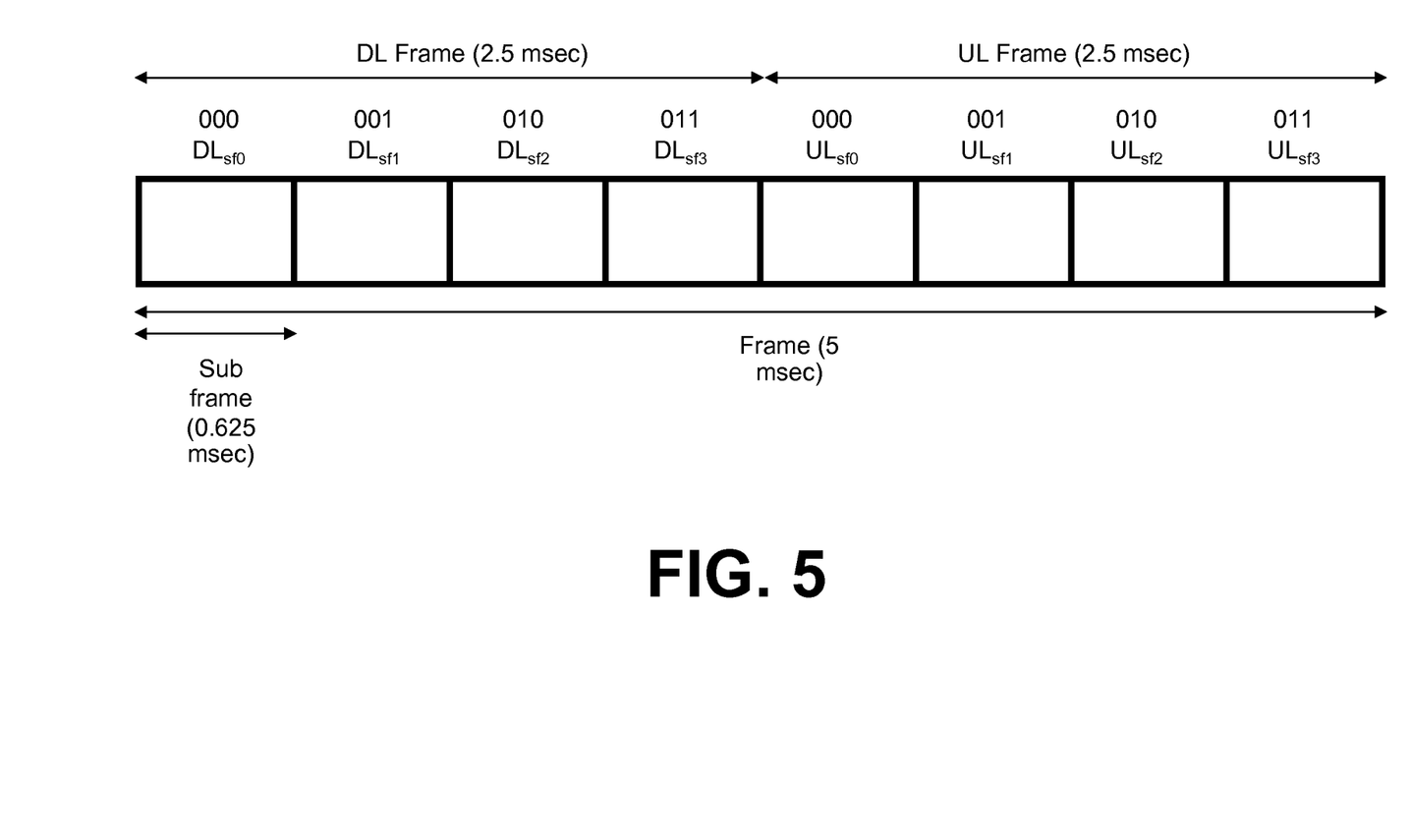

FIGS. 4-5 illustrate an example of time domain structure. Referring to FIG. 4, the frame as shown in FIG. 3 is divided into eight equal portions, denoted subframes 410. Each subframe can be designated as a downlink subframe or an uplink subframe and is comprised of six OFDM symbols 420. The number of symbols in each subframe may vary as a function of other parameter(s), such as the OFDM numerology, the bandwidth, the TDD time gaps, etc. The time-frequency resources of each subframe may be represented by a channel tree.

FIG. 5 illustrates a series of subframes. Referring to FIG. 5, the 5 msec frame is divided into a downlink frame and an uplink frame. The downlink frame is divided into four subframes, denoted $DL_{sf0}$, $DL_{sf1}$, $DL_{sf2}$, and $DL_{sf3}$ and numbered 000, 001, 010 and 011. Similarly, the uplink frame is divided into four subframes, denoted $UL_{sf0}$, $UL_{sf1}$, $UL_{sf2}$, and $UL_{sf3}$ and numbered 000, 001, 010 and 011. The subframe structure may be used to make persistent assignments. For example, if the persistent assignment period is four frames, then the assigned time-frequency resource in one or more subframes repeats every four frames. Similarly, if the persistent assignment period is one frame, then the assigned time-frequency resource in one or more subframes repeats every frame.

As an additional example, in an FDD system with eight subframes, the numbering of subframes for the DL can be 000, 001, 010, 011, 100, 101, 110, and 111, and the numbering of subframes for the UL can be 000, 001, 010, 011, 100, 101, 110, and 111.

Figure 6:
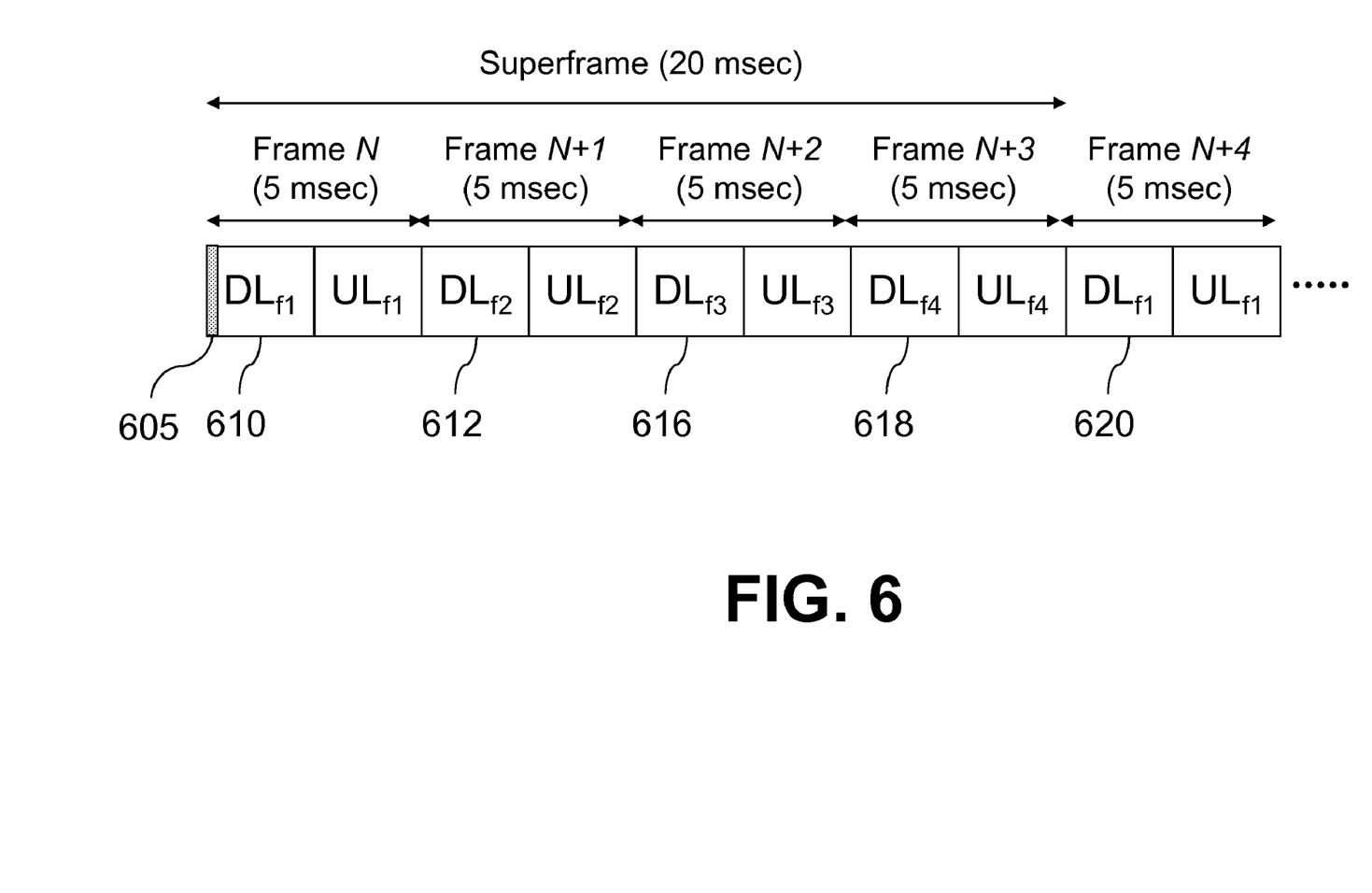

FIG. 6 depicts a repeating sequence of frames. Referring to FIG. 6, a frame is defined as 5 msec and contains both DL and UL frames. A superframe is defined as 20 msec and contains four 5 msec frames (four pairs of DL and UL frames). The first DL frame 610 is denoted $DL_{f1}$, the second DL frame 612 is denoted $DL_{f2}$, the third DL frame 616 is denoted $DL_{f3}$, the fourth DL frame 618 is denoted $DL_{f4}$, and the fifth DL frame 620 is denoted $DL_{f1}$. In this example, the timing of some broadcast information is associating with the superframe timing. For example, broadcast information 605 can be transmitted in the first subframe of the first frame of the superframe.

Figure 7:
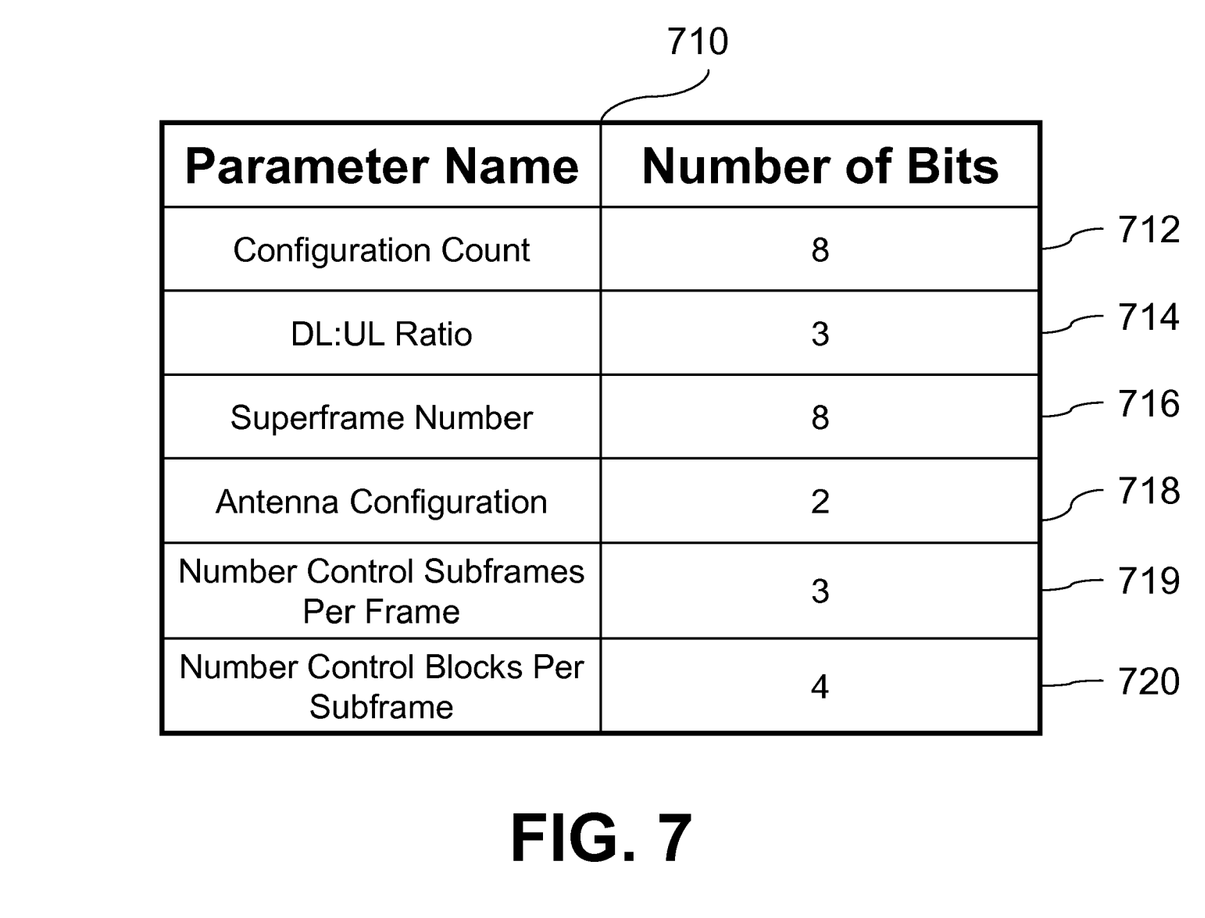
FIG. 7 illustrates an example broadcast control message in accordance with one embodiment of the present invention.

FIG. 7 illustrates an example broadcast control message. The control message 710 contains several fields 712-720 and is used by the base station to convey parameters of the wireless system. The control channel is typically transmitted every superframe, such as the broadcast information 605 of FIG. 6. In some embodiments, the information is transmitted less frequently than every superframe.

The broadcast control message 710 contains an 8 bit indication of the configuration count 712. When the BS increments the configuration change count, then one or more of the fields in the message is different than the previous configuration change count.

The broadcast control message 710 also contains a 3 bit indication of the DL:UL ratio 714. In some embodiments, this is an indication of the number of DL subframes and the number of UL subframes is derived based on the number of DL subframes. The superframe number 716 is an 8 bit field for conveying the count of the current superframe. This field is used for various other system parameters and is used as a basis for randomization algorithms. The antenna configuration field 718 is a 2 bit field for indicating the particular antenna configuration.

The number control subframes per frame field 719 is used for indicating the number of control blocks in each frame. This quantity can be an explicit indication. For example, 000 can be zero control subframes, 001 can be one control subframes, 010 can be two control subframes, etc. The base station and mobile station then use an algorithm or rule to determine which subframe contain the control, as will be described in more detail later. In some embodiments, the number control subframes per frame field 719 is bitmap where each bit corresponds to one subframe. For example, the bitmap can have 8 bits, and each bit can correspond to one subframe. In some embodiments, the first subframe of each frame always contains control information, so the bitmap can be 7 bits, wherein each bit corresponds to one of the subframes, not including the first subframe. In some embodiments, the number of bits in the number control subframes depends on the number of DL subframes, which can be determined based on another parameter, such as the DL:UL ratio 714.

The broadcast message may further contain an indication of the number control blocks per subframe 720. In some embodiments, the number of control subframes per frame field 719 is replaced by an indication of the periodicity of the control subframes. For example, 00 can indicate that control subframes occur every subframe, 01 can indicate that control subframe occur every other subframe, 11 can indicate that control subframe occur every third subframe, etc. This mapping can restart at frame boundaries, superframe boundaries, or can be contiguous across these boundaries.

Figure 8:
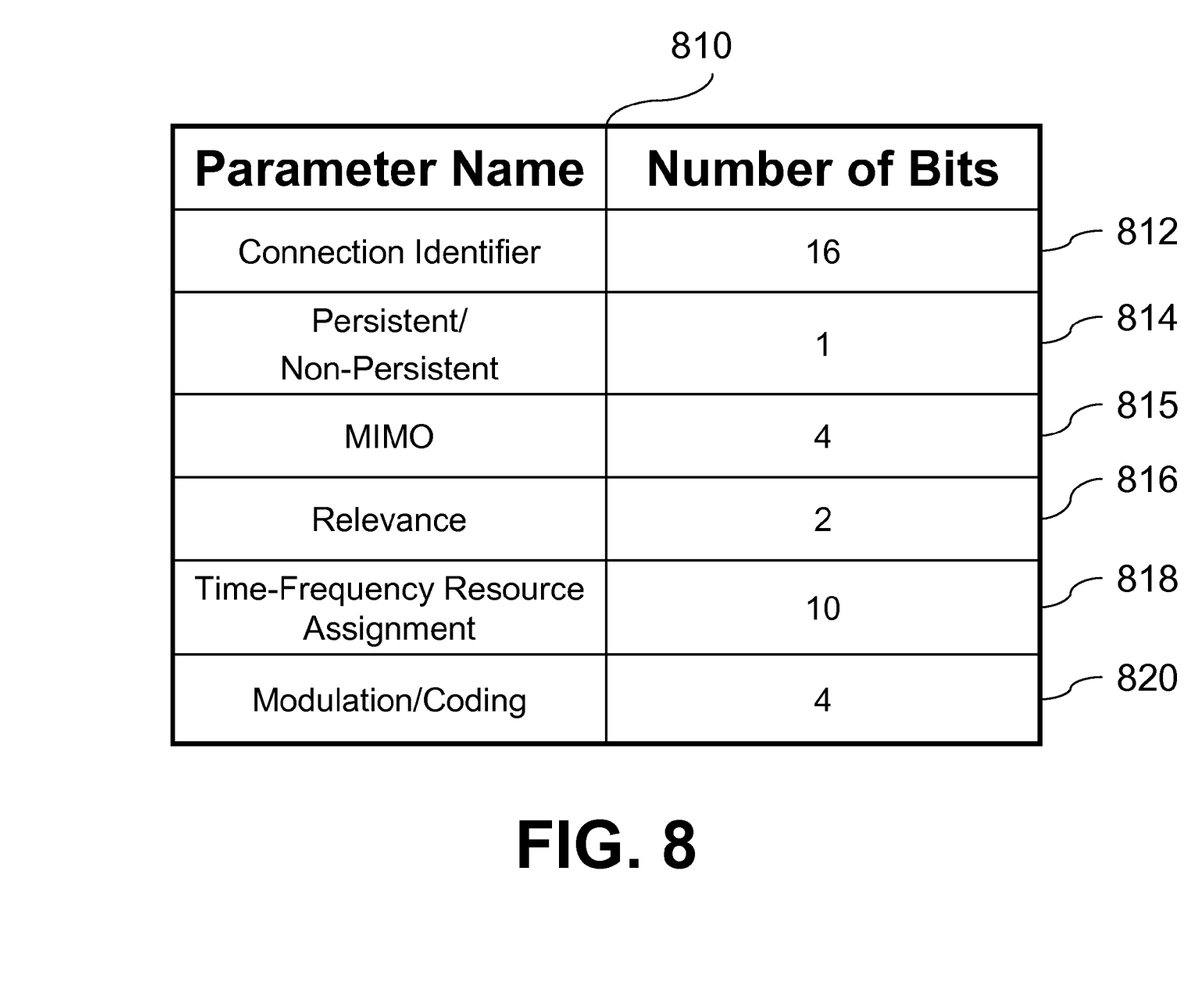
FIG. 8 illustrates an example assignment message in accordance with one embodiment of the present invention.

FIG. 8 is an example assignment message in accordance with one embodiment of the present invention. The assignment message 810 contains a 16-bit connection identifier (CID) field 812, where the connection identifier is used to identify the intended mobile station. In some embodiments, the CID field is omitted from the assignment message itself and is used to scramble the transmission of the assignment message.

The persistent/non-persistent field 814 is used for indicating if the assignment is persistent or non-persistent. In some embodiments, this field is denoted the synchronous/asynchronous, referring to synchronous HARQ (timing of retransmissions is predefined) and asynchronous HARQ (timing of retransmissions is not predefined). The MIMO field 815 is used for indicating the multiple-input multiple-output (MIMO) antenna scheme used at the base station or mobile station.

The relevance field 816 is a 2 bit indication of the relevance of the assignment message, i.e. the timing relevance between the assignment message and the actual transmission being assigned by the assignment message. If control subframes do not occur in each subframe, then the base station needs a method to indicate for which subframe or subframes the assignment is valid. In some embodiments, the relevance is direct mapping. For example, for DL allocations, if the control subframe is subframe N, then 00 can indicate that the time-frequency resource assignment is valid in the current subframe, 01 can indicate that it is valid in subframe N+1, 10 can indicate that it is valid in subframe N+2, and 11 can indicate that it valid in subframe N+3. Using two bits in this manner allows the base station to index four subframes. Therefore, it is only necessary to transmit control information every four subframes.

In other embodiments, one or more values of the relevance field 816 is reserved for extended transmissions. For example, for DL allocations, if the control subframe is subframe N, then 00 can indicate that the time-frequency resource assignment is valid in the current subframe, 01 can indicate that it is valid in subframe N+1, 10 can indicate that it is valid in subframe N+2, 11 can indicate that the time-frequency resource assignment is valid in subframe N, N+1, and N+2.

The time-frequency resource assignment field 818 is used for indicating a particular time-frequency resource assignment. In some embodiments, this field corresponds to a channel tree index, where each channel tree index represents a portion of the total time-frequency resources.

The modulation/coding field 820 is used for indicating the modulation and coding of the packet. The number of bits for each field can change depending on the system and the associated parameters. Further, additional fields may be needed in some embodiments and fewer fields may be needed in some embodiments.

In some embodiments, the overall size of the assignment message 810 depends on one or more parameters of the broadcast control message 710. For example, if the broadcast control message 710 indicates that each subframe is a control subframe, then the relevance field 816 is not needed and is omitted in the calculation of the overall assignment message size 810. In other embodiments, one or more fields in the assignment message 810 are redefined based on one or more parameters of the broadcast control message 710.

For example, if the broadcast control message 710 indicates that each subframe is a control subframe, then the relevance field 816 is not needed and can be replaced by another field, for example, a finer level of quantization for time-frequency resource assignment. As another example, if the broadcast control message 710 indicates that each subframe is a control subframe, then the time-frequency resource assignment field 818 can be 12 bits instead of 10 bits.

Figure 9:
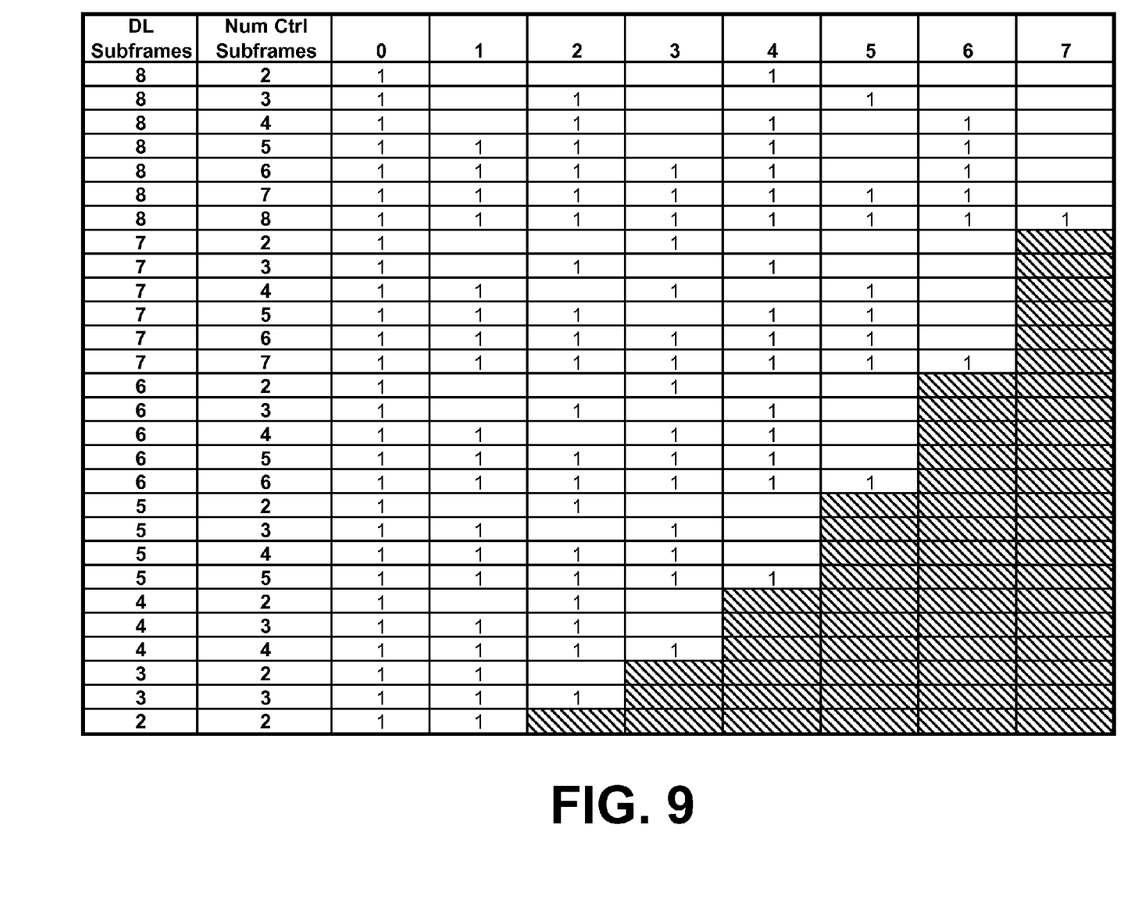
FIG. 9 illustrates the location of control subframes based on a broadcast parameter and the number of downlink subframes.

FIG. 9 illustrates the location of control subframes based on a broadcast parameter and the number of downlink subframes. In FIG. 7, if the base station broadcasts the number of control subframes per frame and the DL:UL ratio, which is used to determine the number of DL subframes per frame, then the base station and mobile station need an algorithm for determining which subframes are control subframes. In FIG. 9, each row contains the number of DL subframes, and the number of DL control subframes.

For each pair of this information, the table indicates whether the subframe (0-7 at the top of the figure) is a control subframe (indicated as 1) or not (indicated as blank). Any mapping can be used as long as it is known at the base station and mobile station. In some embodiments, the base station and mobile station determine the control subframes based on an equation which depends on the number of DL subframes and number of control subframes. In other embodiments, a table, such as the table of FIG. 9, is stored at the base station and mobile station. The base station and mobile station use this mapping, in conjunction with the related parameters, to determine which subframes contain control. If one or more parameters change, then the mobile station and base station re-determine the control subframes. In some embodiments, certain subframes are always control subframes. For example, the first subframe can always be a control subframe as in FIG. 9. As an alternate example, the first and fourth subframes can always be control subframes.

In some embodiments, the HARQ timing is dependent on the location of the control subframes. In some embodiments, the location of the control subframes only impacts the HARQ timing in certain subframes. For example, the location of the control subframes may impact the timing of the acknowledgement information. Similarly, the location of the control subframes may impact the round trip time.

Referring again to FIG. 9, consider the configuration where there are four DL subframes and four control subframes. In this case, the base station can transmit an assignment message in subframe 3, the packet in subframe 3, and the mobile station can send acknowledgement information in subframe 7. If the base station receives a negative acknowledgement, then the base station can send the retransmission in subframe 3 of the next frame.

If the configuration is changed, for example, to the case where there are four DL subframes and one control subframe, then the HARQ timing for this subframe is impacted. In this case, the base station can transmit an assignment message in subframe 0, with the relevance field, such as the relevance 816 of the assignment message 810, set to indicate that the allocation is for subframe 3. The base station can then transmit the packet in subframe 3, and the mobile station can send acknowledgement information in subframe 7. However, in this case, the base station does not have enough time to respond to the negative acknowledgement for the next frame, so the base station has to wait until the frame after the next frame to transmit the subsequent assignment message.

For systems employing synchronous HARQ (in synchronous HARQ systems, the timing of retransmissions is pre-defined), this means that some subframes may have different periods that other subframes or that the period for all subframes is increased based on the location of the control subframes. For example, for the case when there are four DL subframes and four control subframes, the HARQ timing can be 5 msec for all subframes. However, for the case when there are four DL subframes and one control subframe, the HARQ timing can be 10 msec for some subframes and 5 msec for other subframes, or the HARQ timing can be 10 msec for all subframes.

Figure 10:
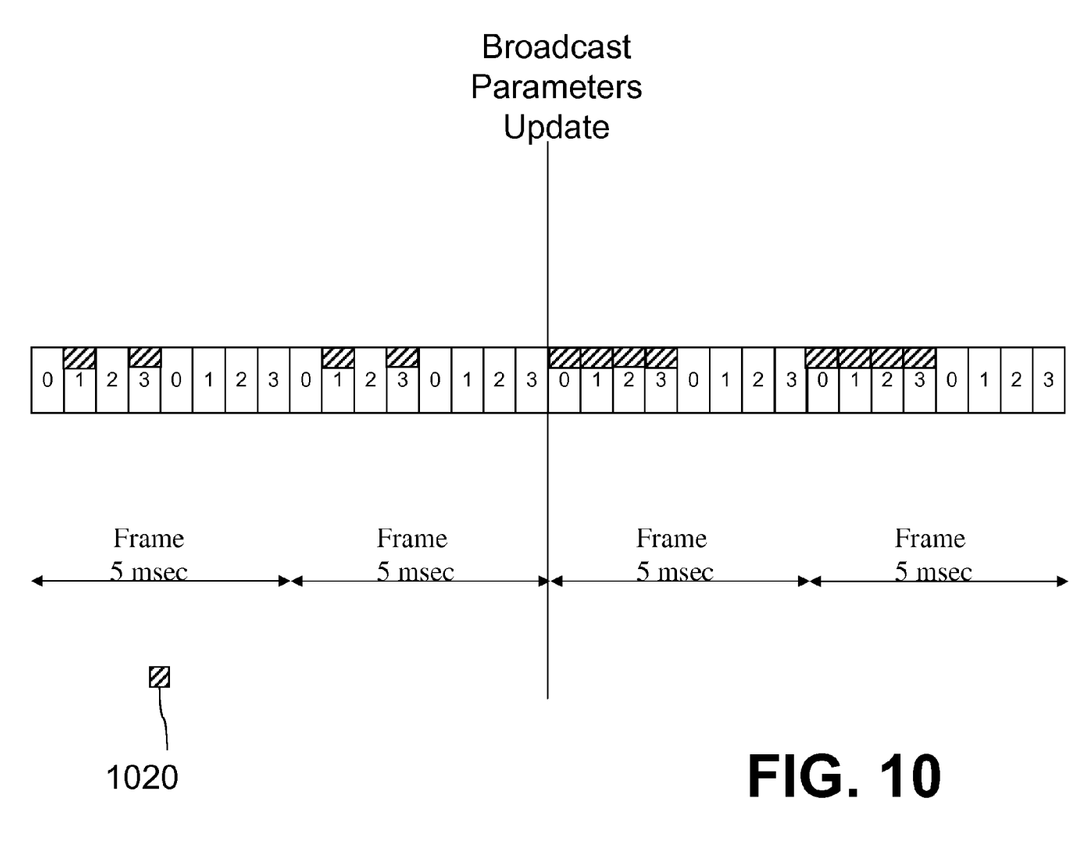
FIG. 10 illustrates the location of control subframes which change based on a broadcast parameter update.

FIG. 10 illustrates the location of control subframes that change based on a broadcast parameter update. Each 5 msec frame in FIG. 10 has the same TDD structure as FIG. 5. On the left of the vertical line, the number of DL subframes is four and the number of control subframes is 2. Based on the table in FIG. 9, the base station and mobile station know that the control subframes are subframes 1 and 3. At the vertical line, the broadcast parameters change. In this case, the number of control subframes changes from two to four. Based on this information and the table in FIG. 9, the base station and mobile station know that the control subframes are subframes 0, 1, 2 and 3.

Figure 11:
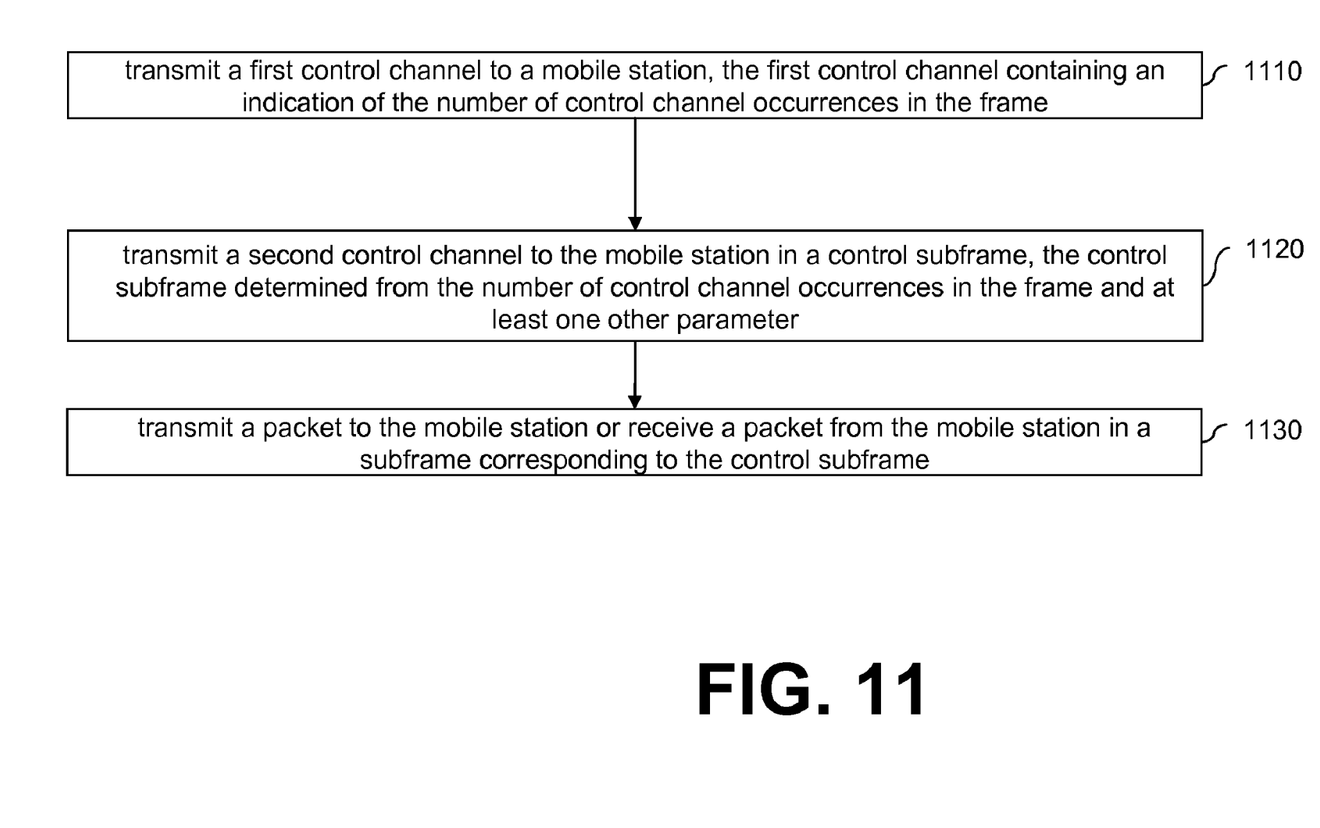
FIGS. 11 and 12 are flow charts for base station and mobile station operation, respectively, in accordance with embodiments of the invention.

FIG. 11 is a flow chart for base station operation in accordance with one embodiment of the present invention. At step 1110, the base station transmits a first control channel to a mobile station, the first control channel containing an indication of the number of control channel occurrences in the frame. At step 1120, the base station transmits a second control channel to the mobile station in a control subframe, the control subframe determined from the number of control channel occurrences in the frame.

At step 1130, the base station transmits a packet to the mobile station or receives a packet from the mobile station in a subframe corresponding to the control subframe. In some embodiments, the first control channel is a broadcast control channel and the second control channel contains an assignment message. In some embodiments, the indication of the number of control channel occurrences is an explicit indication of the number of control channel occurrences. In some embodiments, the first control channel also contains an indication of the total number of downlink subframes in the frame. In some embodiments, the control subframes are determined based on indicated number of downlink subframes and the indicated number of control occurrences.

This determination can be based on a known mapping, such as the mapping of FIG. 9, an equation, and the like. In some embodiments, the indication of the number of control channel occurrences is a bitmap, wherein each bit corresponds to a subframe. In some embodiments, the size of the second control channel is determined based on the indicated number of control channel occurrences.

Figure 12:
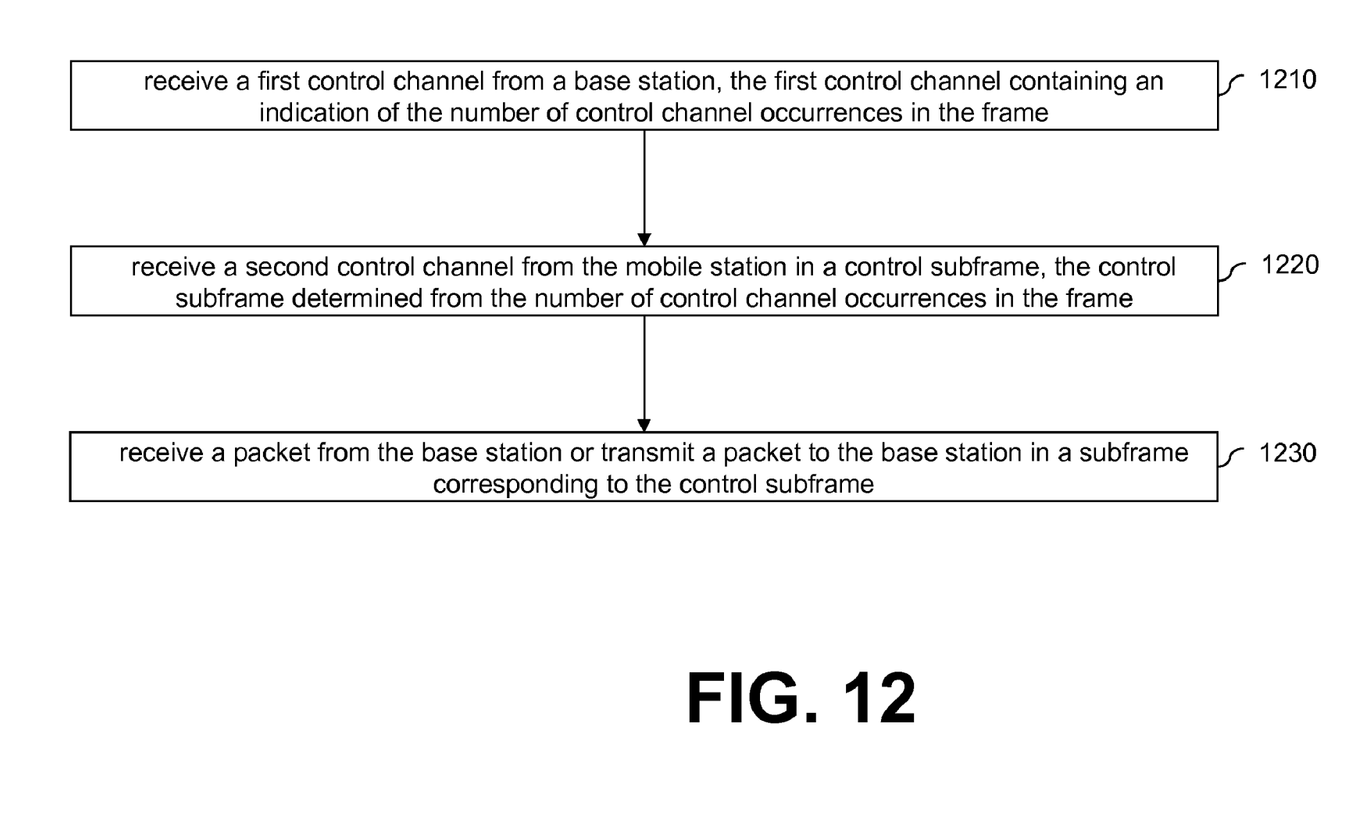

FIG. 12 is a flow chart for mobile station operation in accordance with one embodiment of the present invention. At step 1210, the mobile station receives a first control channel from a base station, the first control channel containing an indication of the number of control channel occurrences in the frame. At step 1220, the mobile station receives a second control channel from the mobile station in a control subframe, the control subframe determined from the number of control channel occurrences in the frame. In step 1230, the mobile station receives a packet from the base station or transmits a packet to the base station in a subframe corresponding to the control subframe.

Figure 13:
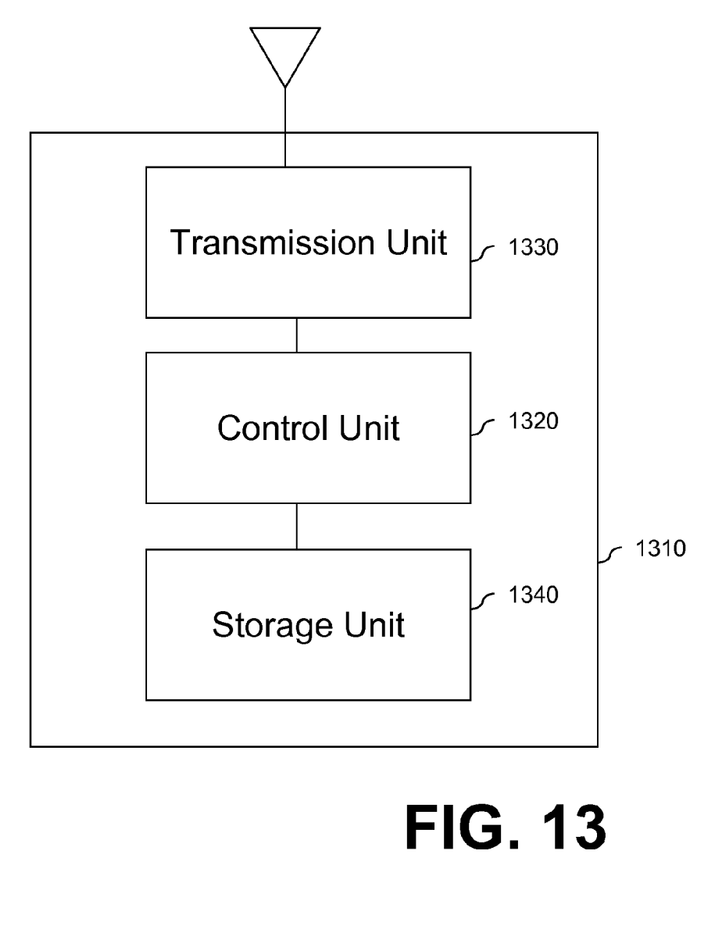
FIG. 13 illustrates a block diagram of a base station of one embodiment.

FIG. 13 is a block diagram of a base station 1310 that can be used in a wireless communication system, as disclosed herein. A control unit 1320 determines a first control channel containing an indication of a number of control channel occurrences in a frame and a control subframe from the number of control channel occurrences in the frame. In one example, the control unit 1320 can be a processor, such as a microprocessor, or any other control device or controller. The control unit 1320 can also perform other tasks used in the operation of base station 1310.

A transmission unit 1330 transmits the first control channel to a mobile station (see e.g., FIG. 2) and the second control channel to the mobile station in the control subframe. The base station 1310 can then communicate with the mobile station by sending or receiving a packet in a subframe based on the control subframe. The transmission unit 1330 can be any transmitter or transceiver as known in the art. The transmission unit 1330 can be in the same housing as control unit 1320. Alternatively, the control unit 1320 may be remote from the transmission unit 1330.

The block diagram of FIG. 13 also shows a storage unit 1340 that stores a lookup table that includes information related to a location of control subframes in a frame. As an example, the lookup table can be a table as shown and described with respect to FIG. 9. The control unit 1320 can determine the control subframe by using the lookup table as described above. As also discussed above, the control subframe can be determined by other means.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method in a base station of transmitting control information to a mobile station, the method comprising:
    transmitting a first control channel to the mobile station, the first control channel containing an indication of the number of control channel occurrences in a frame;
    transmitting a second control channel to the mobile station in a control subframe, the second control channel containing information for communicating a packet between the base station and the mobile station, the control subframe determined from the number of control channel occurrences in the frame; and
    communicating the packet between the base station and the mobile station in a subframe based on the transmitted second control channel information.

2. The method of claim 1, wherein communicating the packet comprises transmitting the packet to the mobile station.

3. The method of claim 1, wherein communicating the packet comprises receiving the packet from the mobile station.

4. The method of claim 1, wherein the first control channel is a broadcast control channel.

5. The method of claim 1, wherein the indication of the number of control channel occurrences includes an explicit indication of the number of control channel occurrences.

6. The method of claim 1, wherein the first control channel further contains an indication of the total number of downlink subframes in the frame.

7. The method of claim 6, wherein the control subframes are determined based on the indication of the total number of downlink subframes in the frame and the indication of the total number of control channel occurrences in the frame.

8. The method of claim 1, wherein the indication of the number of control channel occurrences comprises a bitmap that includes a plurality of bits, each bit corresponding to a subframe.

9. The method of claim 1, wherein the second control channel has a size that is determined based on the indication of the number of control channel occurrences.

10. A method in a mobile station of receiving control information from a base station, the method comprising:
    receiving a first control channel from the base station, the first control channel containing an indication of the number of control channel occurrences in the frame;
    receiving a second control channel from the base station in a control subframe, the second control channel containing information for communicating a packet between the base station and the mobile station, the control subframe determined from the number of control channel occurrences in the frame; and
    communicating the packet between the mobile station and the base station in a subframe based on the received second control channel information.

11. The method of claim 10, wherein communicating the packet comprises transmitting the packet to the base station.

12. The method of claim 10, wherein communicating the packet comprises receiving the packet from the base station.

13. The method of claim 10, wherein the first control channel is a broadcast control channel.

14. The method of claim 10, wherein the indication of the number of control channel occurrences includes an explicit indication of the number of control channel occurrences.

15. The method of claim 10, wherein the first control channel further contains an indication of the total number of downlink subframes in the frame.

16. The method of claim 15, wherein the control subframes are determined based on the indication of the total number of downlink subframes in the frame and the indication of the total number of control channel occurrences in the frame.

17. The method of claim 10, wherein the indication of the number of control channel occurrences comprises a bitmap that includes a plurality of bits, each bit corresponding to a subframe.

18. The method of claim 10, wherein the second control channel has a size that is determined based on the indication of the number of control channel occurrences.

19. A base station for use in a wireless communication system, the base station comprising:
    a control unit that determines an indication of a number of control channel occurrences in a frame; and
    a transmission unit that transmits, to a mobile station, a first control channel that includes the number of control channel occurrences in the frame, and transmits a second control channel in a control subframe, the second control channel including information for communicating a packet between the base station and the mobile station, the control subframe determined from the number of control channel occurrences in the frame;
    wherein the base station communicates with the mobile station by sending or receiving the packet in a subframe based on the second control channel information.

* * * * *